Figure 1:
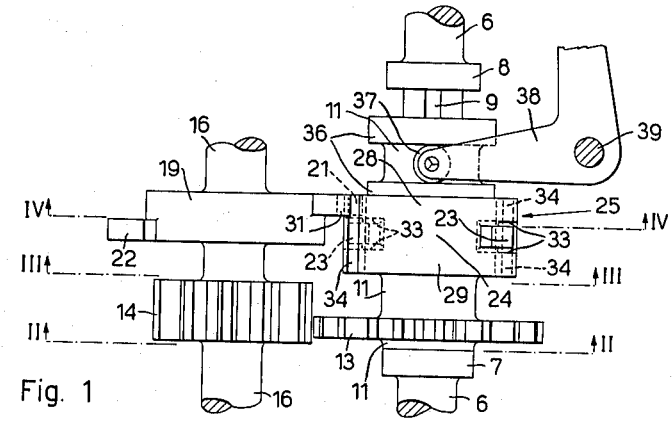

July 12, 1966     T. GASSINO ET AL     3,260,128
ONE CYCLE DRIVE MECHANISM FOR SELECTIVELY
ROTATING A MEMBER OF A BUSINESS MACHINE
Filed Jan. 30, 1964

INVENTORS
TERESIO GASSINO
BY   NICOLO' GIOLITTI
John Toggenburger
AGENT

United States Patent Office 3,260,128
Patented July 12, 1966

3,260,128
ONE CYCLE DRIVE MECHANISM FOR SELECTIVELY ROTATING A MEMBER OF A BUSINESS MACHINE
Teresio Gassino and Nicoló Giolitti, Ivrea, Italy, assignors to Ing. C. Olivetti & C., S.p.A., Ivrea, Italy, a corporation of Italy
Filed Jan. 30, 1964, Ser. No. 341,342
Claims priority, application Italy, Feb. 7, 1963, 2,529/63
9 Claims. (Cl. 74—435)

This invention relates to a one cycle drive mechanism for selectively rotating a member of a buisness machine, comprising a continuously rotating gear, and a mutilated gear meshing with said rotating gear and secured to said member, said mutilated gear having a portion deprived of teeth and normally facing said rotating gear to prevent said mutilated gear from being engaged by said rotating gear, said mutilated gear being engageable by said rotating gear upon being preliminarily rotated through a predetermined extent.

Generally the known one cycle drive mechanisms comprise a dog pivoted on the member to be rotated and spring urged to engage a continuously rotating toothed wheel. The dog is normally prevented from engaging the toothed wheel by a cycle control member operable to release the dog, whereby the drive mechanism is negatively engaged in correspondence of any angular position of the wheel. The negative engagement is subject to jams and is affected by the tension of the spring, while the asynchronous engagement requires an additional control device in the case a synchronous engagement is required, as for example in the case of two or more drive mechanisms to be engaged in series, or in the case the member to be rotated is a code member of a teleprinter, which is to be rotated in synchronism with the main shaft of the machine.

Furthermore, there are known devices comprising mutilated gears to be rotated intermittently and synchronously. However these devices are unadapted to be selectively operated, whereby they cannot be used as a drive mechanism.

The primary object of the invention is to provide a drive mechanism adapted to be positively and synchronously engaged.

Another object is to provide a drive mechanism comprising a mutilated gear adapted to be selectively engaged by a rotating gear.

A further object is to provide a drive mechanism having two opposite positions of rest adapted to represent the conventional pair of conditions of a binary unit of a code combination.

According to the invention, in a one cycle drive mechanism for selectively rotating a member of a business machine comprising a continuously rotating gear, a mutilated gear meshing with said rotating gear and secured to said member, said mutilated gear having a portion deprived of teeth and normally facing said rotating gear to prevent said mutilated gear from being engaged by said rotating gear, said mutilated gear being engageable by said rotating gear upon being preliminarly rotated through a predetermined extent, we now provide a first element bodily rotatable with said mutilated gear in correspondence with said portion and axially distanced therefrom, a second element bodily rotatable with said rotating gear, and selectively operable means for causing said second element to engage said first element for rotating said mutilated gear through said extent, whereby the drive mechanism is positively engaged synchronously with the rotation of said rotating gear.

Figure 2:
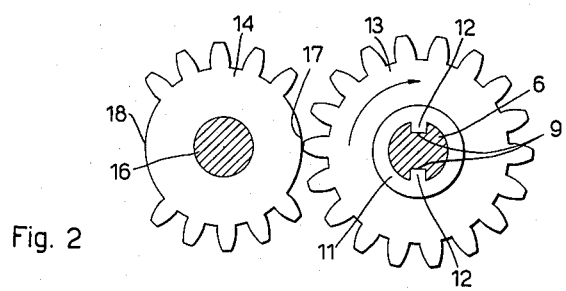
Figure 3:
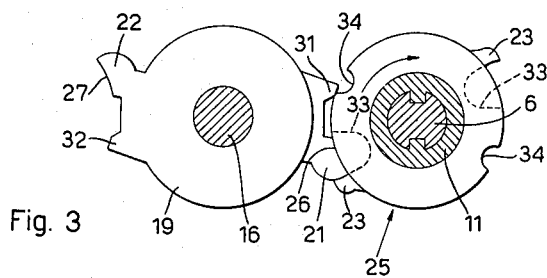
Figure 4:
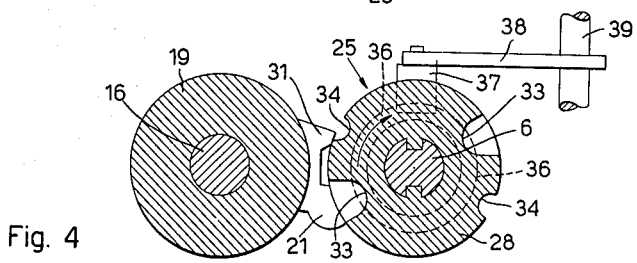

Other objects, features and advantages of the invention will become apparent from the following detailed description of a preferred embodiment thereof, made by way of example and not in a limiting sense, in conjunction with the accompanying drawing, wherein:

FIG. 1 is a view of a one cycle drive mechanism according to the invention;
FIG. 2 is a sectional view taken on the line II—II of FIG. 1;
FIG. 3 is a sectional view taken on the line III—III of FIG. 1;
FIG. 4 is a sectional view taken on the line IV—IV of FIG. 1.

With reference to the drawing, the numeral 6 indicates a shaft continuously rotated clockwise (FIG. 2) in a known manner by an electric motor not shown in the drawing. The numeral 16 indicates a member or shaft of a business machine, which is parallel to the shaft 6 and should be selectively rotated for a cycle of 180 degrees to be located in one of a pair of opposite angular positions. More particularly, the shaft 16 represents one of a plurality of code members of a type selecting device for teleprinters or like printing devices, wherein each code member is adpated to be located in one of a pair of positions corresponding to the two conditions of a binary code unit of a code combination.

The shaft 16 is adapted to be selectively rotated by a one cycle drive mechanism having a pair of rest positions and comprising a continuously rotating gear 13 secured to a hub 11, means being provided for mounting the hub 11 axially shiftable on the shaft 6 and bodily rotatable therewith. More particularly, said mounting means comprise two axial grooves 9 (FIG. 2) formed on the shaft 6 between a pair of flanges 7 and 8 (FIG. 1) and engaged by two corresponding projections 12 (FIG. 2) formed within the hub 11. This hub and the gear 13 are thus axially shiftable between a pair of positions defined by the flanges 7 and 8 (FIG. 1).

Furthermore, the drive mechtnism comprises a mutilated gear 14 meshing with the gear 13 and secured to the shaft 16. The gear 14 has a pair of diametrally opposite portions 17 and 18 (FIG. 2) deprived of teeth, one of said portions normally facing the gear 13 to prevent the gear 14 from being engaged by the gear 13. The gear 14 is engageable by the gear 13 upon being preliminarily rotated through a predetermined extent in the manner which will be hereinafter described. The gear 14 is also large enough to mesh with the gear 13 in both the positions thereof.

Secured to the gear 14 through the shaft 16 is a disk 19 (FIGS. 1 and 3) having a pair of elements each one comprising a pair of teeth 21, 31, and 22, 32 respectively, in correspondence with the portions 17, and 18 respectively, and axially spaced therefrom. The teeth 21, 31 and 22, 32 are provided in two different planes of the disk 19.

Secured to the gear 13 through the hub 11 is a drum 25 having two opposite teeth 23 protruding from a central portion 24 of the drum 25 and adapted to engage the teeth 21 and 22 of the disk 19. Normally the teeth 23 are located in the plane of the tooth 21 or 22 in correspondence with the portion 17 or 18 which at present do not face the gear 13. Each element 21, 31 and 22, 32 has an outer cylindrical surface 26, and 27 respectively, each one extended at the opposite sides of the plane conataining the axis of the gears 13 and 14 and adapted to contact the outer cylindrical surface of a corresponding lateral portion 28, and 29 respectively, of the drum 25. The central portion 24 of the drum 25 is provided with a notch 33 (FIGS. 1 and 4) adjacent to each tooth 23 for allowing the teeth 21 and 22 of the disk 19 to be rotated when engaged by the tooth 23.

The teeth 31 and 32 (FIGS. 1 and 3) are adapted to contact the outer surface of the corresponding lateral portion 28, 29 of the drum 25, for preventing the rebound of the tooth 21, 22 when arrested by the drum 25 at the end of each cycle. The drum 25 in turn is provided with a notch 34 at a suitable angular distance from each tooth 23 and axially extended through all the portions 24, 28 and 29, for allowing the teeth 31 and 32 to be rotated.

Selectively operable means are provided for causing the teeth 23 to engage the element 21 or 22, said means comprising a lever 38 (FIGS. 1 and 4) pivoted at 39 and having a roller 37 engaging a pair of flanges 36 provided on the hub 11. The lever 38 is adapted to be selectively rotated between a pair of angular positions under the control of the corresponding code unit, in a manner known per se.

The one cycle drive mechanism operates as follows.

In the position of the drawing the portion 17 (FIG. 2) of the gear 14 faces the gear 13. The lever 38 (FIG. 1) is in the counterclockwise position, and consequently the hub 11 contacts the flange 7 of the shaft 6. The cylindrical portion 28 of the drum 25 slides on the outer surface of the teeth 21 and 31 of the disk 19 (FIG. 3), while the teeth 23 of the drum 25 (FIG. 1) are located on the plane of the tooth 22 not facing the gear 13, whereby the tooth 21 is not affected by the teeth 23.

If the lever 38 is rotated clockwise, its roller 37 shifts the hub 11 upwards to contact the flange 8 of the shaft 6. The central portion 24 of the drum 25 with the teeth 23 is now located on the plane of the teeth 21 and 31 of the disk 19, and the cylindrical portion 29 thereof is located on the plane of the teeth 22 and 32, while the gear 13 remains in mesh with the gear 14.

When one of the two teeth 23 of the drum 25 engages the tooth 21 (FIG. 3) of the disk 19, the tooth 21 enters the notch 33 and is rotated counterclockwise together with the disk 19 and the gear 14 (FIG. 2) through a predetermined extent. The gear 14 is thus engaged by the gear 13 and the clutch is engaged for a cycle of 180 degrees.

Near the end of the cycle the tooth 32 (FIG. 3) of the disk 19 enters the notch 34 of the drum 25. Thereafter the surface 27 of the tooth 22 contacts the cylindrical surface of the portion 29 of the drum 25, whereby the disk 19 and the gear 14 are arrested. Meanwhile the entered notch 34 leaves the tooth 32, which remains in contact with the cylindrical surface of the portion 29, whereby the rebound of the disk 19 when arrested is prevented. Since the gear 14 (FIG. 2) has now the mutilated portion 18 facing the gear 13, the clutch is disengaged, while the surface of the portion 29 (FIG. 1) slides on the teeth 22 and 32 of the disk 19.

If the lever 38 is now returned counterclockwise to the position of FIG. 1, the hub 11 is shifted downwards to contact the flange 7 of the shaft 6 and to locate its teeth 23 on the plane of the tooth 22 of the disk 19. When one of the teeth 23 engages the tooth 22, the disk 19 is rotated counterclockwise, whereby the gear 14 is engaged by the gear 13 for another cycle of 180 degrees similar to the previously described cycle. The disk 19 and the gear 14 are arrested when the surface 26 of the tooth 21 contacts the cylindrical surface of the portion 28 of the drum 25 in the position shown in FIGS. 1 and 3.

It is thus clear that the drive mechanism is positively engaged synchronously with the rotation of the gear 13, independently of the instant wherein the lever 38 is rotated between the passage of the two teeth 23 of the drum 25. Therefore, in the case of a set of similar drive mechanisms provided for a selecting device controlled by a code combination all the drive mechanisms may be engaged simultaneously even if the signals of the various code units are serially received.

It is intended that modifications, improvements and addition of parts may be made to the described drive mechanism without departing from the scope of the invention. For example, the disk 19 may be shiftably mounted with respect to the gears 14, or the drum 25 may be shiftably mounted with respect to the gear 13, so as to obtain the engagement of the drive mechanism by mutually shifting the disk 19 and the drum 25. Furthermore, the drive mechanism may have a plurality of rest positions and of corresponding teeth 21, 22 instead of two.

Finally, a one cycle drive mechanism for the main shaft of a business machine may be obtained by providing the gear 14 with a single mutilated portion and the disk 19 with a single tooth. In this case thel ever 38 should be returned to rest during the cycle in any known manner. Such a drive mechanism is particularly suitable in the case of a set of drive mechanisms to be serially engaged, as for example in some complex calculating machines, because the drive mechanism subseqeunt to that one operated at present is engaged at a predetermined instant in synchronism with the motor shaft and independently of the instant of the control of the engagement.

What we claim is:

1. A one cycle drive mechanism for selectively rotating a member of a business machine, comprising in combination:
    (a) a continuously rotating gear,
    (b) a mutilated gear meshing with said rotating gear and secured to said member, said mutilated gear having a portion deprived of teeth and normally facing said rotating gear to prevent said mutilated gear from being engaged by said rotating gear, said mutilated gear being engageable by said rotating gear upon being preliminarily rotated through a predetermined extent,
    (c) a first element bodily rotatable with said mutilated gear in correspondence with said portion and axially spaced therefrom,
    (d) a second element bodily rotatable with said rotating gear,
    (e) and selectively operable means for causing said second element to engage said first element for rotating said mutilated gear through said extent, whereby the drive mechanism is positively engaged synchronously with the rotation of said rotating gear.

2. A one cycle drive mechanism for selectively rotating a member of a business machine, comprising in combination:
    (a) a continuously rotating gear,
    (b) a mutilated gear meshing with said rotating gear and secured to said member, said mutilated gear having a portion deprived of teeth and normally facing said rotating gear to prevent said mutilated gear from being engaged by said rotating gear, said mutilated gear being engageable by said rotating gear upon being preliminarily rotated through a predetermined extent,
    (c) a first element bodily rotatable with said mutilated gear in correspondence with said portion and axially spaced therefrom,
    (d) a second element bodily rotatable with said rotating gear,
    (e) means for mounting said elements to be relatively shiftable in the axial direction,
    (f) and selectively operable means for relatively shifting said elements to cause said second element to engage said first element for rotating said mutilated gear through said extent, whereby the drive mechanism is positively engaged synchronously with the rotation of said rotating gear.

3. A one cycle drive mechanism for selectively rotating a member of a business machine, comprising in combination:
    (a) a continuously rotating gear,
    (b) a mutilated gear meshing with said rotating gear and secured to said member, said mutilated gear having a portion deprived of teeth and normally facing said rotating gear to prevent said mutilated gear from being engaged by said rotating gear, said mutilated gear being engageable by said rotating gear upon being preliminarily rotated through a predetermined extent, (c) a first element secured to said mutilated gear in correspondence with said portion and axially spaced therefrom, (d) a second element secured to said rotating gear, (e) means for mounting said rotating gear to be axially shiftable between a pair of positions, said rotating gear being normally located in one position of said pair to place said second element out of the plane of said first element, one of said gears being large enough to mesh with the other of said gears in both said positions, (f) and selectively operable means for temporarily shifting said rotating gear from said position to the other position of said pair of positions to cause said second element to engage said first element for rotating said mutilated gear through said determined extent, whereby the drive mechanism is positively engaged synchronously with the rotation of said rotating gear.

4. A one cycle drive mechanism for selectively rotating a member of a business machine, comprising in combination:

(a) a gear continuously rotating on a predetermined axis, (b) a mutilated gear rotatable on an axis parallel to said predtermined axis and meshing with said rotating gear, said mutilated gear being secured to said member and having a portion deprived of teeth and normally facing said rotating gear which thus is normally unable to rotate said mutilated gear, said mutilated gear being engageable by said rotating gear upon being preliminarily rotated through a predetermined extent, (c) an element bodily rotatable with said mutilated gear in correspondence with said portion and axially spaced therefrom, (d) a drum bodily rotatable with said rotating gear, (e) a tooth protruding from an axial portion of said drum, (f) said element having an outer surface extended at the two opposite sides of the plane containing the axis of said gears and normally contacting the outer surface of said drum to normally prevent said mutiated gear from being rotated, (g) and selectively operable means for causing said tooth to engage said element for rotating said mutilated gear through said extent, whereby the drive mechanism is positively engaged synchronously with the rotation of said rotating gear.

5. A one cycle drive mechanism for selectively rotating a member of a business machine, comprising in combination:

(a) a gear continuously rotating on a predetermined axis, (b) a mutilated gear rotatable on an axis parallel to said predetermined axis and meshing with said rotating gear, said mutilated gear being secured to said member and having a portion deprived of teeth and normally facing said rotating gear which thus is normally unable to rotate said mutilated gear, said mutilated gear being engageable by said rotating gear upon being preliminarily rotated through a predetermined extent, (c) an element secured to said mutilated gear in correspondence with said portion and axially spaced therefrom, (d) a drum secured to said rotating gear, (e) a tooth protruding from an axial portion of said drum, (f) said element having an outer surface extended at the two opposite sides of the plane containing the axis of said gears and normally contacting the outer surface of said drum to normally prevent said mutilated gear from being rotated, (g) means for mounting said rotating gear axially shiftable between a pair of positions, said rotating gear being normally located in one position of said pair to place said tooth out of the plane of said element, one of said gears being large enough to mesh with the other of said gears in both said positions, (h) selectively operable means for temporarily shifting said rotating gear to cause said tooth to engage said elment for rotating said mutilated gear through said extent, whereby the drive mechanism is positively engaged synchronously with the rotation of said rotating gear, (i) and a notch on said drum adjacent to said tooth for allowing said elment to be rotated when so engaged.

6. A one cycle drive mechanism according to claim 5, and comprising:

(1) an auxiliary notch on said drum, said element being formed of a pair of teeth normally located at the opposite sides of the plane containing the axis of said gears, one tooth of said pair of teeth being engageable by said protruding tooth, the other tooth of said pair of teeth being adapted to contact said outer surface at the end of the cycle to prevent the rebound of said element.

7. A one cycle drive mechanism for selectively rotating a member of a business machine, said member having a plurality of rest positions, comprising in combination:

(a) a continuously rotating gear, (b) a mutilated gear meshing with said rotating gear and secured to said member, said mutilated gear having a plurality of portions deprived of teeth and associated with said rest positions, one of said portions normally facing said rotating gear which thus is normally unable to rotate said mutilated gear, said mutilated gear being engageable by said rotating gear upon being preliminarily rotated through a predetermined extent, (c) a plurality of elements secured to said mutilated gear each one in the annular position of one of said portions and axially spaced therefrom, said elements being located in a plurality of different planes, (d) a tooth bodily rotatable with said rotating gear and shiftably mounted with respect to said elements, said tooth being normally located in the plane of one element of said plurality not facing said rotating gear, (e) and selectively operable means for shifting said tooth from said plane to the plane of the element of said plurality facing said rotating gear to engage same for rotating said mutilated gear through said extent, whereby the drive mechanism is positively engaged synchronously with the rotation of said rotating gear and will be automatically disengaged when another portion of said plurality will face said rotating gear.

8. A one cycle drive mechanism for selectively rotating a member of a business machine, said member having a pair of rest positions, comprising in combination:

(a) a continuously rotating gear, (b) a mutilated gear meshing with said rotating gear and secured to said member, said mutilated gear having a pair of diametrally opposite portions deprived of teeth, one of said portions normally facing said rotating gear which thus is normally unable to rotate said mutilated gear, said mutilated gear being engageable by said rotating gear upon being preliminarily rotated through a predetermined extent, (c) a pair of elements secured to said mutilated gear in the angular position of said pair of portions and axially spaced therefrom, said elements being located in a pair of different planes, (d) a tooth bodily rotatable with said rotating gear and shiftably mounted with respect to said elements, said tooth being normally located in the plane of the element of said pair of elements not facing said rotating gear, (e) and selectively operable means for shifting said tooth from said plane to the other plane of said pair of planes to engage the element of said pair of elements facing said rotating gear for rotating said mutilated gear through said extent, whereby the drive mechanism is positively engaged synchronously with the rotation of said rotating gear and will be automatically disengaged when the other portion of said pair of portions will face said rotating gear.

9. A one cycle drive mechanism for selectively rotating a member of a business machine, said member having a pair of rest positions, comprising in combination:

(a) a gear continuously rotating on a predetermined axis (b) a mutilated gear rotatable on an axis parallel to said predetermined axis and meshing with said rotating gear, said mutilated gear being secured to said member and having a pair of diametrally opposite portions deprived of teeth, one of said portions normally facing said rotating gear which thus is normally unable to rotate said mutilated gear, said mutilated gear being engageable by said rotating gear being preliminarily rotated through a predetermined extent, (c) a pair of elements secured to said mutilated gear in the annular position of said pair of portions and axially spaced therefrom, said elements being located in a pair of different planes, (d) a drum secured to said rotating gear, (e) a tooth protruding from the central portion of said drum, (f) each one of said elements having an outer surface extended at the two opposite sides of the plane containing the axis of said gears and adapted to contact the outer surface of the lateral portions of said drum to normally prevent said mutilated gear from being rotated.

(g) means for mounting said rotating gear to be axially shiftable between a pair of positions, said rotating gear being normally located in one position of said pair of positions to place said tooth in the plane of the element of said pair of elements not facing said rotating gear, one of said gears being large enough to mesh with said other gear in both said positions, (h) and selectively operable means for shifting said rotating gear from said position to the other position of said pair of positions to cause said tooth to engage the element of said pair of elements facing said rotating gear for rotating said mutilated gear through said extent, whereby the drive mechanism is positively engaged synchronously with the rotation of said rotating gear and will be automatically disengaged when the other portion of said pair of portions will face said rotating gear.

References Cited by the Examiner
UNITED STATES PATENTS
2,978,919   4/1961   Petit _____ 74—435

DAVID J. WILLIAMOWSKY, *Primary Examiner.*

DON A. WAITE, *Examiner.*

L. H. GERIN, *Assistant Examiner.*